Aug. 28, 1962     H. F. JURGELEIT     3,050,778
PRESSES FOR TREATING SHEET OR STRIP MATERIALS
Filed Sept. 1, 1961                                3 Sheets-Sheet 3

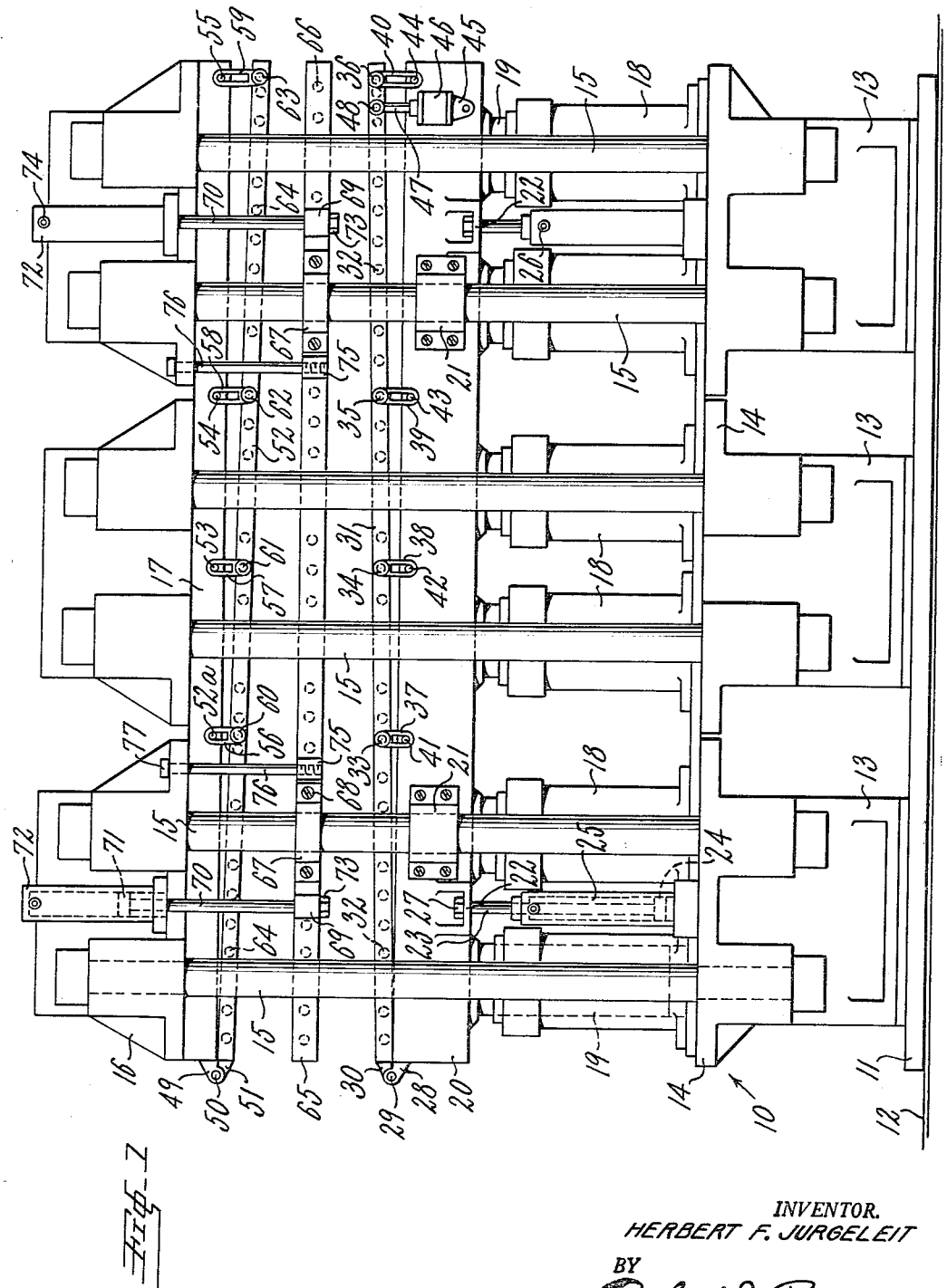

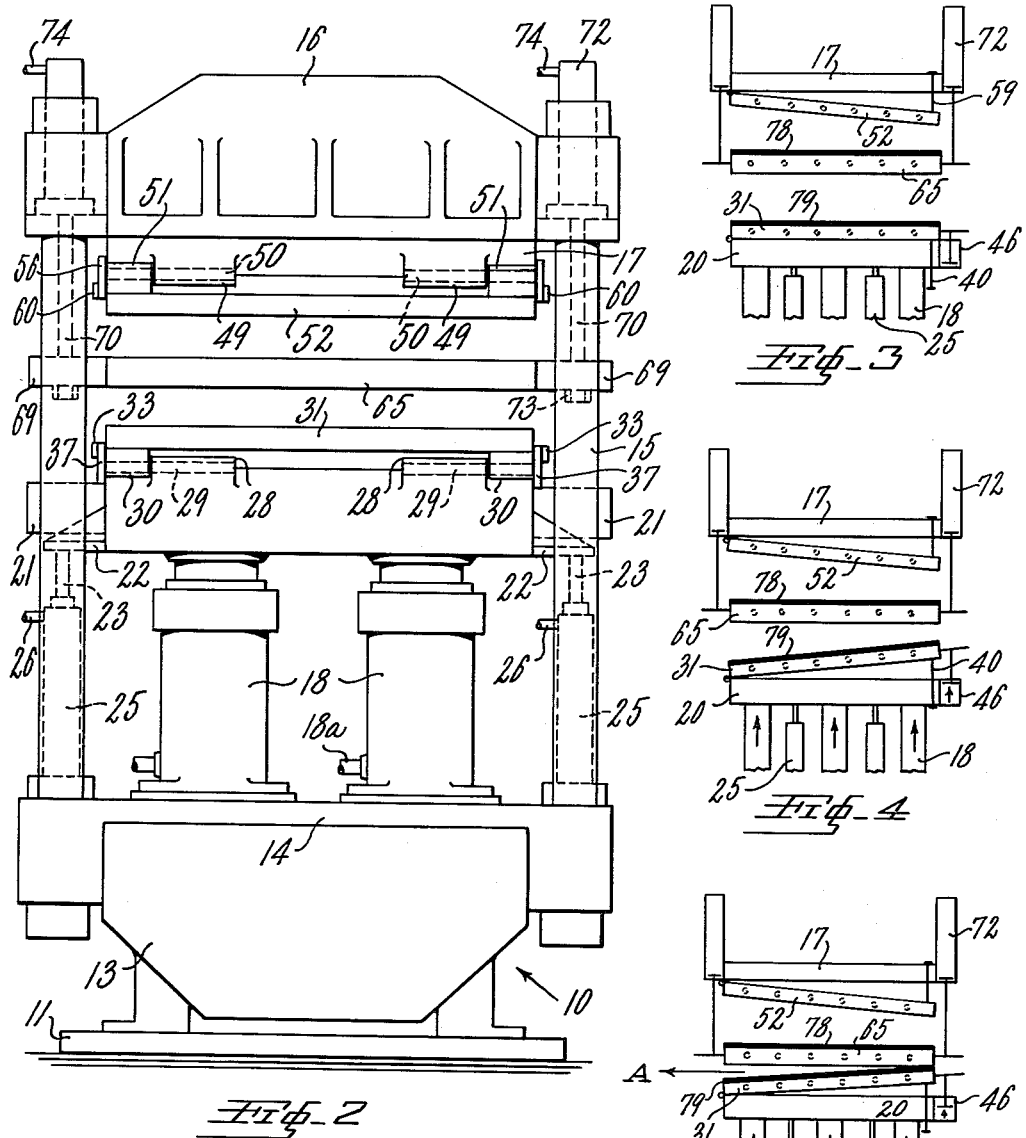

INVENTOR.
HERBERT F. JURGELEIT
BY
Robert J. Patterson
ATTORNEY

United States Patent Office 3,050,778
Patented Aug. 28, 1962

3,050,778
PRESSES FOR TREATING SHEET OR STRIP MATERIALS
Herbert F. Jurgeleit, Oceanside, N.Y., assignor to United States Rubber Company, New York, N.Y., a corporation of New Jersey
Filed Sept. 1, 1961, Ser. No. 136,154
15 Claims. (Cl. 18—17)

This application is a continuation-in-part of my copending application, Serial No. 803,603, filed April 2, 1959, and now abandoned.

This invention relates to processes of subjecting sheet-like articles of natural or synthetic rubber, plastics (thermo-setting or thermoplastic) and other materials to high pressure, and to hydraulic presses especially adapted for carrying out such processes, and in particular to presses provided with one or more tiltable platens.

Belts, matting, tiles (either laminated or of single ply construction) and other flat sheet or strip materials made from any of a multitude of plastic, non-plastic or rubber-like materials or from fabrics coated or impregnated therewith are frequently subjected to high pressure in hydraulic presses between the surfaces of cooperating platens. Where the material is rubber (natural or synthetic) or a rubber-like compound which must be cured or vulcanized, such platens may be constructed to be heated by steam or other fluids or, alternatively, electrically. Hydraulic presses of the multiple ram type are generally employed for forming, embossing and/or curing products of large length and width dimensions and require press platens of large pressing surface area.

Usually such presses have only one press "opening," being equipped with one pair of platens or pressing surfaces. In such a case only one belt, mat, or like article can be processed at one time, the product area being assumed to be substantially co-extensive with the press platen surface area. However, in order to expedite production and reduce the costs of manufacture, presses with two openings, i.e., with two pairs of pressing surfaces for treating two such products at one time, are coming into use.

Th raw material or stock sections from which the products are manufactured are generally prepared in advance from plane or calendered sheets thereof and/or layers of fabric coated or covered with such sheets. At the beginning of a "treating cycle" with the press rams lowered and the platens separated, the raw material is placed in the press between the separated pressing surfaces or platens. One of the difficulties which is always encountered in this operation is that when the press is closed with the pressing surfaces parallel, contact is made over the entire, relatively large area of the article all at one instant, as a result of which small quantities of air will be entrapped between the platens, particularly in the interior zone or portion of the press. The trapped, undissolved air causes the formation of blisters and other defects in the final product, necessitating rejection thereof and bringing about consequent loss of time, labor, materials, etc.

Another difficulty inherent in this operation arises during the opening of the press after the completion of the treatment period. Inasmuch as the platen pressing surfaces are maintained parallel at the beginning of the separation movement thereof, a large separating force is required to break the vacuum and adhesion forces tending to hold the platens together. Some belt and matting compounds are more adhesive and "sticky" after being treated than others, and some waste of labor and time on the part of the press operator is thus often involved in the opening of the press.

A number of expedients for operating a double-opening press so as to overcome the aforesaid air-venting and platen separation problems have been proposed heretofore. These are basically characterized by the use of mechanical or hydraulic means for tilting the press ram-cap, which defines the lowermost platen surface, and the intermediate or floating press platen. Stated in other words, at the lower press opening one end of the ram-cap makes contact with the intermediate platen slightly in advance of the other end when closing the press, and conversely one end separates or peels off in advance of the other end upon opening of the press. The same motions are imparted to the intermediate platen by corresponding mechanical or hydraulic means so as to produce the same air-venting and peeling actions in the upper of the two press openings.

The conventionally employed constructions of this type have, however, been found to be mechanically unsound and otherwise inferior for a variety of reasons. Primarily, tilting of the intermediate platen and/or ram-cap subjects the guides for the intermediate platen and ramcap, as well as the rams and cylinder ram guide bushings, the ram packings, and the ramcap equalizer mechanism to undesired and needlessly high stresses and strains, tending to cause excessive wear on the various elements. Moreover, such conventional constructions are more expensive to produce and maintain due to the extra auxiliary cylinders, valves, controls and other equipment required. Still further, it has ordinarily been impossible to attain satisfactory air-venting and peeling actions by means of the aforesaid known press arrangement.

It is an important object of the present invention, therefore, to provide a press construction equipped with tiltable platens and designed to eliminate the aforesaid disadvantages and drawbacks of known presses of this type.

It is also an object of the present invention to provide a press which is characterized by means affording highly efficacious air-venting and peeling actions.

A related object of the present invention is the provision, in a press of the aforesaid type, of a non-tilting floating or intermediate platen designed to cooperate with a tilting platen carried by the press ramcap and with a tilting platen carred by the oppositely located stationary cross-head of the press.

The foregoing and other objects, characteristics and advantages of the present invention will become more fully clear from the following detailed description thereof when read in conjunction with the accompanying drawings, in which:

FIG. 1 is a front elevational view of a column or rod-type, vertical, double-opening press constructed in accordance with the present invention;

FIG. 2 is an end elevational view of the press shown in FIG. 1; and

FIGS. 3 to 9 are schematic front view illustrations of the elements of the press in various stages of the operation of the latter.

Figure 6:
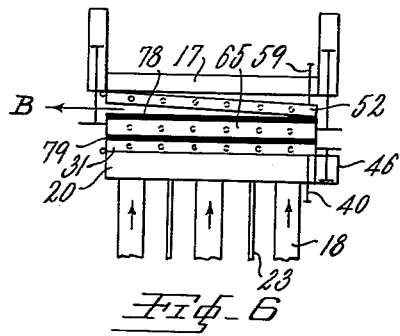

For the purpose of facilitating an understanding of the present invention, the following desription will be related to a column or rod-type vertical press designed to be used in vulcanizing or curing articles of rubber or other vulcanizable plastic materials, but it will be understood that the same structure may be employed in heat and/or pressure treating or otherwise processing non-vulcanizable plastic materials of the thermosetting or thermoplastic types as well as non-plastic materials. Moreover, it will also be understood that the air venting and peeling principles of the present invention are equally applicable to and susceptible of incorporation in different types of presses, such as horizontal type presses, or presses of the "windowframe" construction, among others.

Referring now to FIGS. 1 and 2 of the drawings, it will be seen that the press 10 comprises a rigid, preferably metallic base 11 mounted on any suitable rigid supporting surface 12, which may be the floor of a building or room or the like. Rigidly mounted on the base 11 is the main and lower supporting and bearing structure 13 of the press which defines the lower crosshead 14. Fixedly retained in the lower cross-head 14 by any suitable means are tie rods 15 to the upper ends of which is affixed the upper bearing or support structure 16 defining the upper cross-head 17.

Mounted on the lower cross-head 14 at spaced locations are ram cylinders 18 each of which is provided with a hydraulic fluid flow line 18a. Reciprocally arranged within each ram cylinder is a ram or piston 19. A ramcap 20 extends across and is supported by the pistons 19 at the upper ends of the latter, being preferably secured thereto in any suitable manner. At each of its opposite sides the ramcap 20 is provided with a plurality of guide sleeves or members 21 which slidably embrace respective ones of the tie rods 15 at the opposite sides of the press. The ramcap 20 is further provided at both sides and adjacent its lower edges with a plurality of brackets or projections 22 each of which is provided with an opening (not shown) through which extends the piston rod 23 of a piston 24 reciprocally arranged in a cylinder 25. The cylinders 25 are rigidly mounted on the lower cross-head 14, and each of them is provided with a hydraulic fluid flow line 26 adjacent its uppermost end. The piston rods 23 are secured to the respective projections 22 of the ramcap 20 by means of nuts 27 affixed to the free ends of these piston rods which project through the aforesaid openings in the projections 22.

The ramcap 20 is further provided at one end with a pair of journals or bearings 28 in each of which is rotatably received a portion of a respective one of a pair of hinge rods 29. The remainder of each of the hinge rods 29 is fixedly received in a respective journal or bearing 30 rigidly connected with a platen 31 at one end of the latter. Journals 28 and 30 and hinge rods 29 form a hinge connection between platen 31 and ramcap 20 which is capable of resisting large lateral loads with essentially no lateral movement between platen 31 and ramcap 20. (In the case of a hinge type connection, the fits between the moving parts are to be no closer than class 4 as specified in Marks' "Mechanical Engineer's Handbook," fifth edition, page 904, Table 43, McGraw-Hill, and in Vladimir L. Maleev's, "Machine Design," third edition, page 294, Table 13–1, International Textbook Company, Scranton, Pa.) Thus, it will be seen that platen 31 (which is the lower heating platen of the press) is hinged or pivoted to the ramcap 20 so as to be tiltable relative thereto, yet the hinge connection permits no substantial lateral movement between platen 31 and ramcap 20.

The platen 31 is provided throughout its entire length with a plurality of interconnected bores or passageways 32 through which steam or other fluid may be coursed for the purpose of heating and/or cooling the platen, depending upon the intended operating conditions for the material treatment.

The lower platen 31 is further provided at each side thereof with a plurality of projecting pivot or suspension bolts 33, 34, 35 and 36 on which are suspended a plurality of link members 37, 38, 39 and 40, respectively, these link members being of different and gradually increasing lengths as seen from the hinged end of the platen to the free end thereof. As best shown in FIG. 1, the link members 37 to 40 are provided with correspondingly dimensioned elongated slots, the purpose of which will become clear presently. The ramcap 20 is provided at each side with a plurality of laterally projecting stop or limit pins 41, 42, 43 and 44 which project into and are slidably received, respectively, in the slots of the link members 37 to 40.

Hingedly connected to the ramcap 20 at each of the opposite sides thereof and adjacent the end remote from the pivotal mounting of the platen 31 is a bracket or lug 45 which is integral with a small hydraulic cylinder 46 in which is slidably mounted a piston (not shown) the piston rod 47 of which extends upwardly from the cylinder and is pivotally connected at 48 to the platen 31 adjacent the link member suspension bolt 36. As will be readily appreciated from FIG. 1, the function of the piston and cylinder combinations 46—47 (only one of which is shown) is to tilt the platen 31 relative to the ramcap 20 about the axis of the hinge bolts or pins 29, the extent of such tilting movement being limited by the lengths of the slots in the various link members 37 to 40, i.e. by the maximum permissible extent of travel of these link members relative to the respective limit pins 41 to 44.

The upper cross-head 17, like the ramcap 20, is provided at one end with a pair of journals or bearings 49 in each of which is rotatably received a portion of a hinge bolt or pin 50. The remainder of each of the hinge bolts 50 is fixedly received in a journal or bearing 51 affixed to one end of a platen 52 at one end of the latter and adjacent the opposite side edges thereof. Journals 49 and 51 and hinge bolts 50 form a hinge connection between platen 52 and cross-head 17 which is capable of resisting large lateral loads with essentially no lateral movement between platen 52 and cross-head 17. (In the case of a hinge type connection, the fits between the moving parts are to be no closer than class 4 as specified in Marks' "Mechanical Engineer's Handbook," fifth edition, page 904, Table 43, McGraw-Hill, and in Vladimir L. Maleev's "Machine Design," third edition, page 294, Table 13–1, International Textbook Company, Scranton, Pa.) The platen 52 (which is the upper heating platen of the press) thus is hinged to the upper cross-head 17 and is tiltable relative thereto, yet the hinge connection permits no substantial lateral movement between platen 52 and cross-head 17.

For the purpose of limiting the gravitational downward movement of the platen 52 relative to the cross-head 17, the latter is provided at each of its opposite sides with a plurality of stop or limit pins 52a, 53, 54 and 55 which project slidably into the respective slots of a plurality of link members 56, 57, 58 and 59 pivotally connected to the platen 52 by means of bolts 60, 61, 62 and 63, respectively, the slots in the various link members being of gradually increased length as seen from the hinged end of the platen in FIG. 1. In a manner similar to the platen 31, the upper press platen 52 is provided with an interconnected network of bores or flow passageways 64 through which the steam or other fluid may be coursed for appropriately varying the temperature of the platen.

Arranged between the upper and lower press platens 31 and 52 is an intermediate platen 65 which too is provided throughout its entire length with an interconnected network of bores or passageways 66 for the purpose of conducting steam and/or other fluids through the platen. At each of its opposite sides the platen 65 is provided with a plurality of guide sleeves or brackets 67 (only two are shown in FIG. 1) which are rigidly affixed thereto, as by screws 68, and slidably embrace respective ones of the tie rods 15. Although in the illustrated embodiment of the invention the guide sleeves or members 67 cooperate with the same tie rods 15 as the ramcap guide sleeves 21, it will be readily appreciated that this relationship is not essential to the practice of the present invention.

The platen 65 is further provided at each of its opposite sides with a plurality of projections or brackets 69 through which extend respective piston rods 70 connected with pistons 71 reciprocally arranged in hydraulic cylinders 72 rigidly mounted on the upper support structure 16. Each of the piston rods 70 is connected to its respective projection 69 and thus to the intermediate platen 65 by means of a nut 73 mounted on the free end of the piston rod extending through the said projection. Each cylinder 72 is provided with a hydraulic fluid flow line 74, Also connected to the platen 65 at each of the opposite sides thereof are projections or brackets 75 in each of which is fixedly received, as by being screwed or press-fitted thereinto, the lowermost end of a suspension rod 76 the upper portion of which extends slidably through the upper cross-head 17. Each rod 76 is provided at its uppermost end with a head 77 engageable with the upper surface of the bearing or support structure 16 so as to limit downward movement of the rod relative thereto.

Thus it will be seen that the intermediate platen 65 is suspended and effectively floats between the upper and lower press platens 52 and 31, positive downward movement of the intermediate platen being effected, to the extent permitted by the suspension rods 76, by the piston and cylinder combinations 71—72. Moreover, it will be readily understood that whereas the lower and upper press platens 31 and 52 are tiltable relative to the ramcap 20 and upper cross-head 17, respectively, the intermediate platen is mounted for purely parallel rectilinear reciprocal movement relative to the upper cross-head. The importance of this aspect of the invention will be more fully explained hereinafter.

The vulcanization process and thus the operation of the press 10, according to the present invention, will now be explained with reference to FIGS. 3 to 9 as well as to FIGS. 1 and 2, and it will be assumed at first that it is desired to cure sheets or strips of finite length and width and not greater in area than the respective surface areas of the various press platens.

Prior to the start of operation, the press 10 is in its open condition as illustrated in FIG. 3, with the intermediate platen 65 suspended in its lowest position, with the upper platen 52 tilted downwardly relative to the upper cross-head 17 to the extent permitted by the link members 56 to 59, with the lower press platen 31 resting flat on the ramcap 20, and with the various rams or pistons 19 (and thus also the ramcap) in their lowermost positions. Two sheets 78 and 79 of rubber, rubberized fabric, rubber-coated webbing or other type of curable plastic material are now placed onto the upper surfaces of the intermediate platen 65 and the lower press platen 31, respectively, care being taken to ensure that the edges of the sheets do not project beyond the confines of the respective platens.

Hydraulic fluid is now fed into the cylinders 46 so as to cause the pistons thereof to rise, whereby the corresponding end of the lower press platen 31 is raised through the intermediary of the piston rods 47, tilting this platen about the axis of the hinge bolts 29 to the extent permitted by the link members 37 to 40. At the same time, hydraulic fluid is pumped into the ram cylinders 18 so as to initiate the rising movement of the ramcap 20 and tilted lower platen 31 as a unit toward the floating intermediate platen 65 which is still in its original rest position. This condition, during which pressure fluid is exhausted from the cylinders 25, is illustrated in FIG. 4.

After a predetermined interval of time, the uppermost end region of the tilted platen 31, or rather of the sheet 79 resting thereon, comes into contact with the corresponding end region of the floating platen 65. It is for the purpose of causing this edgewise contact that it is essential to raise or tilt the platen 31 off the ramcap 20 by means of the piston cylinder combinations 46—47 prior to the start of the upward movement of the ramcap. As the ram pistons 19 and therewith the ramcap 20 continue to move upwardly, the lower platen 31 will begin to be "flattened out," i.e., the angle of tilt thereof relative to the ramcap 20 will be decreased against the force of the tilt motors 46, while concurrently the angle between the lower platen 31 and the floating platen 65 will be decreased, due to the fact that the intermediate platen 65 is being retained in its lowermost position by the pressure of the hydraulic fluid acting on the pistons 71 in the cylinders 72. This is the condition which is illustrated in FIG. 5. It will be readily appreciated that as this continues, any air originally disposed in the space between the platens 31 and 65 will tend to be expelled from the said space, starting at the first-closed portion thereof, in the direction of the horizontal arrow A shown in FIG. 5. Moreover, it will be seen that during the "flattening out" of the lower platen 31, no tiling (or any movement, for that matter) of the intermediate platen can take place.

After the lower press opening has been closed, the intermediate platen 65 begins its upward movement under the influence of the lower platen 31 (which by now rests flat on the ramcap 20) and ram means 18—19—20, and ultimately one end region of the intermediate platen, or rather of the sheet 78 resting thereon, will come into contact with the lowermost end region of the downwardly tilted upper platen 52. This is the condition illustrated in the upper half of FIG. 6. It will be understood that the hydraulic fluid pressure in the ram cylinders is usually sufficiently great to overcome the pressure of the fluid in the cylinders 72, whereby the intermediate platen can rise. Alternatively, of course, the cylinders 72 could be deactivated at this time.

As the upward movement of the ramcap 20, lower platen 31 and intermediate platen 65 continues, the upper platen 52 will begin to be raised toward the upper cross-head 17 and thus the angle between the platens 52 and 65 will begin to decrease. As a result, any air originally located in the space between the platens 52 and 65 will be expelled from the said space, starting at the first-closed portion thereof, in the direction of the horizontal arrow B shown in FIG. 6. Upon completion of the upward stroke of the ram means 18—19—20, the upper platen 52 will be "flattened out" fully against the upper cross-head 17 and the sheet 78 will be pressed over its entire expanse by the floating platen 65 against the upper platen 52. The condition of the press at this point is illustrated in FIG. 7.

By way of résumé, therefore, it will be understood from the foregoing that the intermediate platen comes into contact first with the free (unhinged) ends of the platens 31 and 32, and that such contact gradually progresses from the free ends to the hinged ends of these platens. Thus, there is provided, in accordance with the present invention, a finite period of time for escape of air from the interior portions or zones of the press openings, as distinguished from the known presses where no such escape period is provided. Consequently, the possibility of any air pockets being formed between the sheets 78 and 79 on the one hand and the platens 52 and 65 on the other is substantially eliminated by the present invention.

Figure 7:
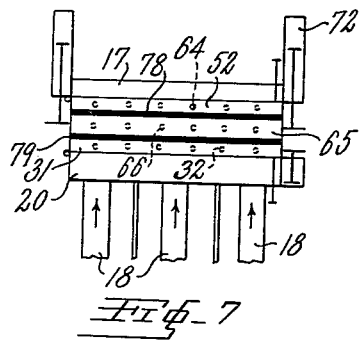

With the press elements as shown in FIG. 7, the steam or other heating fluid flowing through the passageways 32, 64 and 66 of the platens 31, 52 and 65, respectively, subjects the sheets 78 and 79 to a temperature sufficiently high to ensure complete curing and vulcanization of the sheets 78 and 79, the latter, of course, being retained between the platens for a sufficient period of time determined in relation to the temperature of the fluid employed. It is to be noted that if an alternating heating and cooling of these sheets is required, the flow of heating fluid may be periodically interrupted and replaced by a flow of cooling fluid.

As soon as this interval of time has passed and the sheets or other articles are completely cured, which may be indicated by any suitable timing or control device or the like (not shown), hydraulic fluid under pressure is admitted through the lines 26 into the cylinders 25, hereinafter referred to as pull-down cylinders, and through the lines 74 into the power cylinders 72, hereinafter referred to as push-down cylinders (assuming that these were previously deactivated), while at the same time the hydraulic fluid for the rams is exhausted from the ram cylinders 18. The pistons 71 and therewith the piston rods 70 are, consequently, moved downward so as to push down the intermediate or floating platen 65 and cause it to follow the downwardly moving ramcap 20 and platen 31. At the very outset of this movement, the upper platen 52 will be pulled away at its free end from the cross-head 17, and there will be no immediate separation of the platens 65 and 52 at this region. However, since the movement of the platen 52 is angular about its hinge axis 50, while the movement of the platen 65 is linear and parallel to the upper cross-head 17 (due to the engagement between the guide sleeves 67 and the associated tie rods 15), that end of the floating platen 65 which underlies the hinged end of the upper platen 52 will begin to separate from the latter. This is the condition illustrated in FIG. 8.

In effect, therefore, the separation between these two platens will be a gradual one, starting at the aforesaid region of the hinged end of platen 52 and gradually progressing toward the region of the free end of the said platen. Thus, the now cured sheet 78 will be effectively peeled off the upper platen 52.

The same sequence of events is thereafter repeated in the lower half of the press. It will be noted that as the ramcap 20 moves downwardly during the peeling of the sheet 78 from the upper platen 52, the platens 65 and 31 will remain parallel to one another and to the ramcap until the peeling action in the upper half of the press has been completed and, in fact, until the platen 65 has reached the lowest point of its movement as defined by engagement of the heads 77 of the suspension rods 76 with the upper supporting structure 16. At this point, as the pistons 24 are further retracted into the pulldown cylinders 25 to continue the lowering of the ramcap 20, that end of the floating platen 65 which overlies the hinged end of the lower platen 31 will begin to become separated from the latter due to the fact that the platen 31 is drawn downwardly by the ramcap 20 only at the said hinged end while the remainder of the platen 31, through the intermediary of the cured sheet 79, tends to adhere to the lower surface of the floating platen 65. This action is also enhanced by virtue of the fact that the tilt motors or piston-cylinder combinations 46—47 again become active to push the free end of the platen 31 upwardly.

Figure 9:
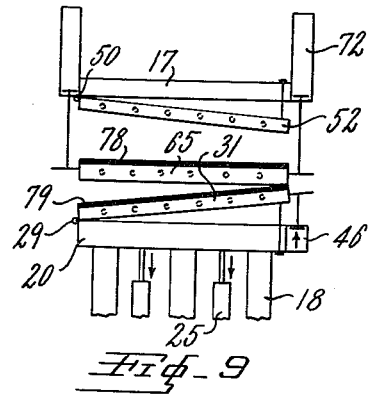

Upon further movement of the ramcap 20 under the influence of the pull-down cylinders 25, however, the remainder of the sheet 79 will be gradually peeled off or separated from the platen 65, this being the condition illustrated in FIG. 9. Again it will be noted that the separation starts at the region of the hinged end of platen 31 and progresses toward the region of the free end of this platen, thereby affording the desired peeling action for the sheet 79.

Once the platens 31 and 65 have been completely separated, the hydraulic fluid is exhausted from the cylinders 46 and the platen 31 then will drop down to lie flat on the ramcap 20, at which time the parts of the press will again be in the position illustrated in FIG. 3. The cured sheets 78 and 79 are now removed by the operator, and new and uncured sheets placed onto the platens 65 and 31 for the next cycle or sequence of vulcanizing operations as hereinbefore described.

The foregoing vulcanization cycle has been described with respect to the curing of sheets or strips of finite areas, each adapted to be placed individually into the press and removed individually therefrom. The herein disclosed vulcanizing press is equally capable of carrying out the process according to the present invention on bands or belts of material substantially greater in length than the various press platens 31, 52 and 65.

Figure 8:
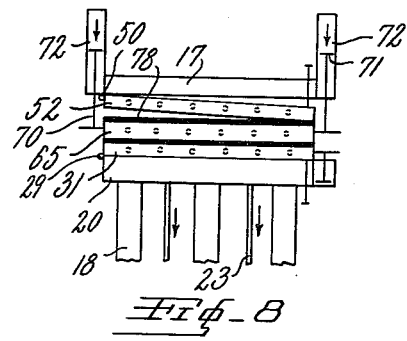

When it is desired to cure such belts or the like, a first section of one belt is introduced into the space between the platens 31 and 65 (preferably from the right-hand side of the space as seen in FIG. 3), while a first portion of another belt is introduced into the space between the platens 52 and 65 (also from the right-hand end of the space as seen in FIG. 3). The rams 19 and tilt piston rods 47 are now actuated and the press is closed as hereinbefore described with the expulsion of air from the spaces between the platens in the directions of the arrows A and B shown in FIGS. 5 and 6. Thereafter the belts are cured due to the existence of elevated platen temperatures resulting from the flow of steam through the platens, whereupon the press is opened again to peel the cured belt sections off the lower surfaces of the platens 52 and 65, as shown in FIGS. 8 and 9. The operator, manually or with the aid of any suitable drawing mechanism, now advances the belts until the cured sections have left the press openings and until the next adjacent, still uncured sections of the belts are located in the said press openings. These uncured sections are now subjected to the same treatment, and thereafter the entire operation is again repeated as long as necessary to cure the belts in their entirety.

In this connection, it will be appreciated that it may not be practical to cure each secion of each belt over the entire surface area thereof confined at any one time between the press platens, since this may give rise to over-curing or under-curing of the boundary region between any two adjacent sections if the belt-advancing mechanism fails to shift the belt after one curing operation by an amount which corresponds precisely to the length of the cured section. In order to avoid this possibility, which would naturally lead to the production of unusable or reject belts, it is contemplated in accordance with the present invention to provide means for cooling or lowering the temperature of the platens at the inlet end of the press, which may be accomplished in any desired manner, for example, by passing water through respective isolated passageways located in the respective platens 31, 52 and 65 at the right-hand ends thereof as seen in FIG. 1. When operating in this manner, the trailing marginal portion of each belt section which remains uncured or only partially cured, thereafter constitutes the leading marginal portion of the next section to be cured and will be located at the take-off end of the press adjacent the hinge locations of the upper and lower press platens.

It will be understood that the principles of the present invention, although described hereinabove as applied to a press provided with a plurality of tiltable platens, are equally applicable to a press provided with only one tiltable platen, say the platen 52. In such a case, the intermediate platen 65 as such is dispensed with and its equivalent non-tiltable platen would be carried directly by the ramcap 20. The reverse could, of course, also be true, with the equivalent of the intermediate platen being carried by the upper cross-head 17 and only a tiltable platen 31 being carried by the ramcap 20.

In any of the forms of the invention, it may be found desirable, for the purpose of avoiding contamination of the articles being cured, to provide protector flaps of any suitable type around the top and bottom platens in order to prevent entry of dust or other foreign particles and impurities into the spaces between the steam platens, the cross-heads and the ramcap. Moreover, in the event that heat insulating means are provided on the remote surfaces of the platens 31 and 52, it is deemed preferable to mount such insulating means in stationary condition against the cross-head 17 and ramcap 20 to avoid possible deterioration which might result from constant movement of the insulating means with the platens.

It will be further understood that a number of modifications of the invention may be undertaken without involving any departure from the spirit of the present invention. By way of example, the hydraulic tilt motors 46 may be replaced by other types of platen shifting devices, such as cams, rack and pinion mechanisms, spring devices and the like, the only requirement being that these devices apply a yielding force to the free end of the platen 31 for reasons clearly apparent from the foregoing description. Likewise, the link members 37 to 40 and 56 to 59 could be replaced by different tilt-limiting means, such as bolts of graduated length arranged laterally of the platens or projecting through the ramcap or stationary cross-head within the platen working area. Although it is possible to operate the entire press manually, suitable control means may be provided, including timing and indicating mechanisms as well as actuating means for the various valves controlling the flow of hydraulic fluid through the lines 18a, 26 and 74 for the purpose of rendering the operation of the press completely automatic. In such a case, of course, if the articles being vulcanized are belts or like continuous length products, the operation of the feeding or advancing means for such products should preferably be synchronized with the operation of the press so as to ensure that the feeding means cannot be actuated until the press has opened after the termination of a vulcanizing operation. In addition it will be understood that any of the structural elements disclosed herein which are unique to a vertical type press would have to be replaced by equivalent elements adapted for use in other types of presses if the hereinbefore described vertical press is not employed.

By way of résumé, therefore, it will be seen that, in its broadest aspect, the present invention is characterized by the gradual confining of an article between a pair of treatment platens starting at one end of the latter and progressing to the other end thereof, and, subsequent to the treatment, by the peeling of the finished article from one of the platens starting at the aforesaid other end thereof and progressing to the aforesaid one end thereof. In this manner, during the confining operation air originally retained in the space between the platens is expelled from this space, while during the peeling stage of the operation separation of the platens from one another is greatly facilitated. The treatment may be thermal or mechanical in nature or a combination thereof.

From the point of view of the apparatus form of the invention, these basic characteristics are attained by the provision, between the ram means and the stationary cross-head of a press, of a first platen mounted for rectilinear reciprocal movement codirectionally with the ram means, and at least one additional platen tiltably mounted between the aforesaid first platen and either the ram means or the cross-head of the press. The arrangement is such that the second platen is hinged at one end, while its other end is free and always is the first part of the second platen to come into contact with the first platen. For a double-opening press, of course, two tiltable platens are provided, one between the cross-head and the first platen, and one between the ram means and the first platen.

Moreover, it will be appreciated from FIG. 1 that the hinge mounting for either one of the two tiltable platens could be located at the other end of the press. Thus, at the start of an operation, the platens 31 and 52 will be substantially parallel to one another rather than in converging relationship (as seen from their hinged ends). Moreover, in this manner the arrangement may be so determined that the air-venting during closing of the press can start at either end thereof and that the peeling action in each opening of the press can start at either end thereof. In any case, however, the air-venting in each opening must begin at that end of the press opposite to the end at which the peeling action begins in the same opening.

Having thus described the invention, what is claimed and desired to be secured by Letters Patent is:

1. A press for flat stock comprising two press members arranged for parallel rectilinear reciprocal movement toward and away from each other, one of said press members comprising a first platen; a second unitary platen located intermediate said first platen and the other of said press members and extending over said other press member substantially co-extensive with said first platen, said first and second platens having substantially planar mating surfaces; hinge means connecting said second platen at one end thereof to the corresponding end of said other press member for angular reciprocal movement relative to the latter, said hinge means permitting no substantial lateral movement between said second platen and said other press member; means operatively connected to said second platen and said other press member for limiting the extent of angular movement of said second platen relative to said other press member; said first and second platens during relative approaching movement of said press members coming into engagement with one another first at the other end of said second platen and thereafter progressively over their entire surface areas to said one end of said second platen, said first and second platens during relative diverging movement of said press members separating from one another first at said one end of said second platen and thereafter progressively over their entire surface areas to said other end of said second platen.

2. A press for flat stock comprising a stationary cross-head; ram means arranged for reciprocal movement toward and away from said cross-head and including a ramcap; a first platen mounted between and parallel to said cross-head and said ramcap; a second unitary platen located intermediate said first platen and said ramcap and extending over the latter substantially co-extensive with said first platen; hinge means connecting said second platen at one end thereof to the corresponding end of said ramcap for angular reciprocal movement relative to the latter, said hinge means permitting no substantial lateral movement between said second platen and said ramcap; first cooperable means on said ramcap and said second platen for limiting said angular movement thereof away from said ramcap and toward said first platen; said first and second platens during relative approaching movement thereof coming into engagement with one another first at the other end of said second platen and thereafter progressively over their entire surface areas to said one end of said second platen, said first and second platens during relative diverging movement thereof separating from one another first at said one end of said second platen and thereafter progressively over their entire surface areas to said other end of said second platen, said first and second platens having substantially planar mating surfaces; and heating means carried by each of said platens.

3. A press for flat stock comprising a stationary cross-head; ram means arranged for reciprocal movement toward and away from said cross-head and including a ramcap; a first platen mounted between and parallel to said cross-head and said ramcap; means to reciprocally move said first platen codirectionally with said ramcap; a second unitary platen located intermediate said first platen and said cross-head and extending over the latter substantially co-extensive with said first platen; hinge means connecting said second platen at one end thereof to the corresponding end of said cross-head for angular reciprocal movement relative to the latter, said hinge means permitting no substantial lateral movement between said second platen and said cross-head; first cooperable means on said cross-head and said second platen for limiting said angular movement thereof away from said cross-head and toward said first platen; said first and second platens during relative approaching movement thereof coming into engagement with one another first at the other end of said second platen and thereafter progressively over their entire surface areas to said one end of said second platen, said first and second platens during relative diverging movement thereof separating from one another first at said one end of said second platen and thereafter progressively over their entire surface areas to said other end of said second platen, said first and second platens having substantially planar mating surfaces; and heating means carried by each of said platens.

4. A vulcanizing press, comprising a stationary cross-head, ram means arranged for reciprocal movement toward and away from said cross-head and including a ramcap, a first platen mounted between and parallel to said cross-head and said ramcap, means to reciprocally move said first platen co-directionally with said ramcap, a second unitary platen located intermediate said first platen and said ramcap and extending over the latter substantially co-extensive with said first platen, hinge means connecting said second platen at one end thereof to the corresponding end of said ramcap for angular reciprocal movement relative to the latter, said hinge means permitting no substantial lateral movement between said second platen and said ramcap, first cooperable means on said ramcap and said second platen for limiting said angular movement thereof away from said ramcap and toward said first platen, a third unitary platen located intermediate said first platen and said cross-head and extending over the latter substantially co-extensive with said first platen, second hinge means connecting said third platen at one end thereof to the corresponding end of said cross-head for angular reciprocal movement relative to the latter, said second hinge means permitting no substantial lateral movement between said third platen and said cross-head, second cooperable means on said cross-head and said third platen for limiting said angular movement thereof away from said cross-head and toward said first platen, and heating means carried by each of said platens.

5. A vulcanizing press according to claim 4, further comprising means operatively interconnected between said ramcap and said second platen adjacent the free end of the latter for angularly moving said second platen relative to said ramcap.

6. A vulcanizing press according to claim 4, further comprising power means carried by said cross-head and operatively connected with said first platen for moving the same away from said cross-head, and means interconnecting said cross-head and said first platen for limiting the extent of movement thereof away from said cross-head.

7. A vulcanizing press according to claim 4, further comprising a lower cross-head and power means operatively connected to and supporting said ramcap for moving the same away from said lower cross-head.

8. A vulcanizing press according to claim 4, said hinge means connecting said second platen to said ramcap and said second hinge means connecting said third platen to said cross-head being located at the same end of the press, whereby said second and third platens when angularly moved away from said ramcap and said cross-head, respectively, converge toward one another and said first platen as seen from the hinged ends of said second and third platens.

9. A vulcanizing press according to claim 4, said hinge means connecting said second platen and said ramcap being located at one end of the press, and said second hinge means connecting said third platen and said cross-head being located at the opposite end of the press, whereby said second and third platens when moved angularly away from said ramcap and said cross-head, respectively, are disposed substantially parallel to one another.

10. A vulcanizing press according to claim 4, further comprising a rigid base, a plurality of tie rods rigidly interconnecting said base and said cross-head at opposite sides of the press, said ramcap and said platens being disposed between said tie rods, a plurality of first guide sleeves connected with said ramcap at the opposite sides thereof and slidably embracing respective ones of said tie rods, and a plurality of second guide sleeves connected to said first platen at the opposite sides thereof and slidably embracing respective ones of said tie rods.

11. A press, comprising a stationary cross-head, a ramcap arranged for parallel rectilinear reciprocal movement toward and away from said cross-head, hydraulic ram means connected to said ramcap for moving the same toward said cross-head, a first platen located intermediate said ramcap and said cross-head and disposed parallel thereto, first hydraulic power means connected to said first platen for moving the same away from said cross-head, second hydraulic power means connected to said ramcap for moving the same away from said first platen and said cross-head, means connected to said first platen for limiting the extent of movement of the latter away from said cross-head, a second unitary platen located intermediate said first platen and said ramcap and substantially co-extensive therewith, first hinge means connecting said second platen at one end thereof to the corresponding end of said ramcap, said first hinge means permitting no substantial lateral movement between said second platen and said ramcap, means connected with said second platen at the other end thereof for moving the same angularly away from said ramcap, means operatively connected to said second platen and said ramcap for limiting the extent of angular movement of the former relative to the latter, a third unitary platen located intermediate said first platen and said cross-head and substantially co-extensive therewith, second hinge means connecting said third platen at one end thereof to the corresponding end of said cross-head for angular movement away from the latter, said second hinge means permitting no substantial lateral movement between said third platen and said cross-head, and means operatively connected to said third platen and said cross-head for limiting the extent of angular movement of the former relative to the latter.

12. A press according to claim 11, further comprising hydraulic means connected with said second platen at said other end thereof for positively moving the same angularly relative to said ramcap.

13. A press according to claim 11, said first and second hinge means being laterally aligned with one another and located adjacent the same end of said first platen.

14. A press according to claim 11, said first and second hinge means being located adjacent the opposite ends of said first platen.

15. A press according to claim 11, further comprising heating means arranged on each of said platens.

References Cited in the file of this patent

UNITED STATES PATENTS

| | | |
|---|---|---|
| 1,246,740 | Haefely | Nov. 13, 1917 |
| 1,488,504 | Keyes | Apr. 1, 1924 |
| 1,968,826 | Graf | Aug. 7, 1934 |